US005742915A

United States Patent [19]

Stafford

[11] Patent Number: 5,742,915

[45] Date of Patent: Apr. 21, 1998

[54] POSITION REFERENCED DATA FOR MONITORING AND CONTROLLING

[75] Inventor: Darrell E. Stafford, Dunlap, Ill.

[73] Assignee: Caterpillar Inc., Peoria, Ill.

[21] Appl. No.: 573,216

[22] Filed: Dec. 13, 1995

[51] Int. Cl.[6] .......... G06F 19/00

[52] U.S. Cl. .......... 701/35; 701/29; 701/207; 340/438

[58] Field of Search .......... 364/443, 424.034, 364/424.035, 424.038, 424.039, 424.04, 449.1, 449.7; 340/438, 439

[56] References Cited

U.S. PATENT DOCUMENTS

| | | | |
|---|---|---|---|
| 4,258,421 | 3/1981 | Juhasz et al. | 364/424.04 |
| 4,344,136 | 8/1982 | Panik | 364/424.04 |
| 5,014,206 | 5/1991 | Scribner et al. | 364/443 |
| 5,119,102 | 6/1992 | Barnard | 342/357 |
| 5,142,281 | 8/1992 | Park | 340/991 |
| 5,311,197 | 5/1994 | Sorden et al. | 342/457 |
| 5,327,347 | 7/1994 | Hagenbuch | 364/424.07 |
| 5,412,570 | 5/1995 | Gruler et al. | 364/424.04 |
| 5,475,597 | 12/1995 | Buck | 364/443 |
| 5,600,558 | 2/1997 | Mearek et al. | 364/424.034 |
| 5,638,273 | 6/1997 | Coiner et al. | 364/424.04 |

*Primary Examiner*—Gary Chin

[57] ABSTRACT

A system and method for recording the time and position of a machine during the occurrence of an event. The system includes means to determine the operating characteristics of the machine, means to determine a set of operating parameters of the machine, means to detect a significant event including a deviation in operating parameters, means to determine the time of occurrence and the geographic location at the time of occurrence, means to determine a level of significance of a deviation, means to store the information im memory, and means to transmit the information to a remote location.

24 Claims, 3 Drawing Sheets

POSITION REFERENCED DATA FOR MONITORING AND CONTROLLING

TECHNICAL FIELD

This invention relates generally to a system and method for monitoring machines and more particularly to a system and method for recording and selectively transmitting the time and location during the occurrence of an event.

BACKGROUND ART

Systems to monitor machine performance and communicate with remote locations are known in the art. The emergence of accurate machine positioning systems are also known. Combinations of machine monitoring, communications, and position determination have been developed and are used for many applications.

For example, in U.S. Pat. No. 5,014,206, Scribner et al disclose a tracking system which determines and records the location of a machine during the steps of loading and unloading. The information is stored in a data collector on the machine and is retrieved at the end of the work shift. However, this system is limited to a specific application and does not have the capability to respond differently to various situations, e.g., any deviation from the normal operations of the machine.

As another example, in U.S. Pat. No. 5,311,197, Sorden et al disclose a method and apparatus using a distance measuring system (DMS) to transmit location information following an accident or other abnormal situation. The DMS could be a land-based navigation system such as LORAN or a satellite-based system such as the Global Positioning Satellite (GPS) System. The transmission of a distress signal is used to enable a respondent to travel directly to the location of the machine. However, many situations exist where an event occurs that does not require a response. These events can provide much useful information if they are stored in memory, especially if the location of the machine at the time of the event is recorded also. This would mean determining whether an event required an immediate response or if it could be stored for later retrieval.

The present invention is directed to overcoming one or more of the problems, as set forth above.

DISCLOSURE OF THE INVENTION

In one aspect of the present invention a system for recording the time and position of a machine during an occurrence of a significant event is provided. The system determines a plurality of operating parameters of the machine, detects a significant event during operation of the machine, and determines the time the event occurred and the geographic location of the machine at the time of occurrence.

The system also stores the significant event, the time of occurrence, and the geographic location in memory and transmits the significant event, the time of occurrence, and the geographic location to a remote location.

In another aspect of the present invention a method for recording the time and position of a machine during an occurrence of a significant event is provided. The method includes the steps of determining a plurality of operating parameters of a machine, detecting a significant event during the operation of the machine, and determining a time of occurrence of the significant event and a geographic location of the machine at the time of occurrence. The method further includes the steps of storing the significant event, the time of occurrence, and the geographic location in memory and transmitting the significant event, the time of occurrence, and the geographic location to a remote location.

BEST MODE FOR CARRYING OUT THE INVENTION

The present invention provides a system for determining a plurality of operating parameters of a machine 10, detecting significant events which occur, determining the time and geographic location of the machine 10 during the occurrence of the significant events, and selectively storing and transmitting the significant event, the time of occurrence, and the geographic location as required. The present invention has many applications. For purposes of explanation only, the present invention will be discussed in relation to two applications.

Figure 1:
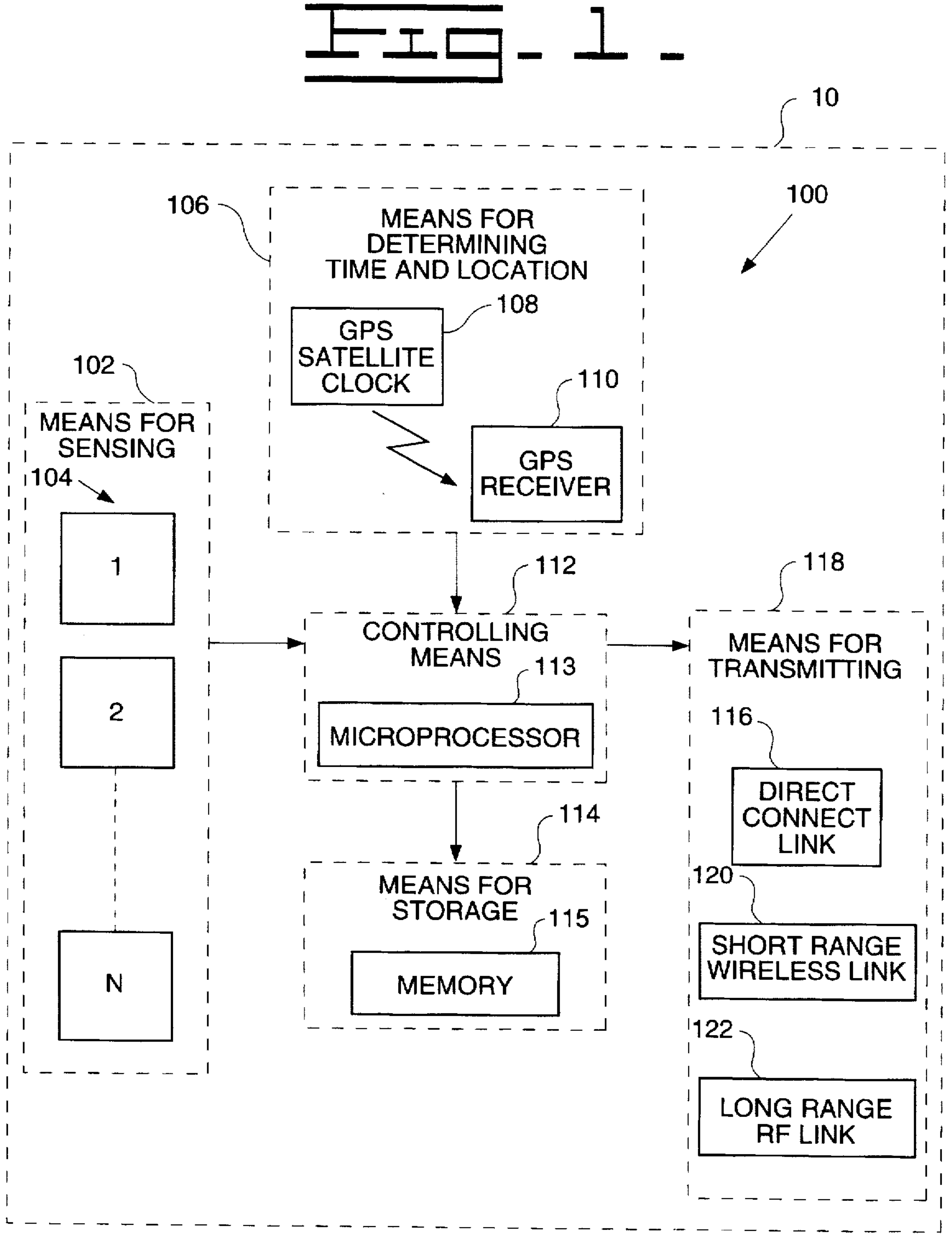
FIG. 1 is a block diagram of a machine monitoring and control system according to an embodiment of the present invention.

With reference to FIG. 1, a block diagram of a system 100 for monitoring and controlling position referenced data is shown. The system 100 may apply to a wide variety of mobile machines including, but not limited to, on-road trucks such as semi-tractor trucks, automobiles, off-road trucks, earthmoving machines, agricultural machines, and the like.

A means 102 located on the machine 10 senses a plurality of operating characteristics. The means 102 for sensing includes a plurality of sensors 104. The sensors 104 perform a variety of sensing functions, and are normally part of the standard array of machine components. For example, an off-road mining truck has almost 70 sensors. The sensors 104 monitor many operating characteristics and include, but are not limited to, temperature sensors, pressure sensors, hydraulic systems sensors, brake system sensors, safety backup systems sensors, and many more.

The information from the sensors 104 is relayed to an on-board controlling means 112 which receives characteristics and responsively determines parameters. Parameters may be sensed, modeled or calculated. A significant event is a predetermined condition of the operating parameters (see below).

Preferably, the controlling means 112 includes a microprocessor 113 and may be a standard component on the machine 10. Most machines being produced now have microprocessors installed as standard features, which are already obtaining data from the many sensors 104 located on the machine 10.

The controlling means 112 may receive some sensed characteristics for direct analysis, e.g., failure of a component or system, or a temperature reading. In this case, the operating parameter correlates to the sensed operating characteristic. In other cases, the controlling means 112 may receive characteristics from two or more sensors 104 and calculate a resultant parameter. For example, pressure sensors may be installed at both the input and output of a filter. The two pressure measurements are sent to the controlling means 112, which then determines a filter differential pressure. The calculated differential pressure is then used to determine the presence of any blockage that may exist in the filter.

A means 106 determines the location of the machine 10. In the preferred embodiment, the location determining means 106 includes a GPS satellite clock 108 and a GPS receiver 110. The GPS receiver 110 determines the geographic location of the machine 10 and sends the coordinates to the controlling means 112. GPS technology is well known in the art and will not be discussed further. It should be noted that other location determining methods (e.g., LORAN or laser positioning systems) may be used without deviating from the spirit of the invention.

The GPS receiver 110 receives clock data from the GPS satellite clock 108, which is also sent to the controlling means 112 to track the time that events occur. GPS clocks are extremely accurate (current technology supports +/− 40 nanosecond accuracy) and provide a good reference. For example, if a fleet of on-highway semi-tractor trucks is distributed throughout the country, it would be very desirable to track the times of events associated with these trucks with respect to a common time reference. Alternatively, other clock sources may be utilized. Examples would include the WWV clock source or a standard clock signal from a central location.

A means 114 receives and stores the data compiled by the controlling means 112. The storing means 114 includes standard on-board memory 115, and is usually found with the standard microprocessor 113 found on most machines now produced.

The information from the controlling means 112 can also be output by a variety of means. A direct connect link 116 directly connects the controlling means 112 to a remote terminal. This allows an operator to download data directly to the remote terminal. One common direct connect link is a standard RS-232 port. However, other direct connect protocols could be used without deviating from the idea of the present invention.

The downloaded data could be used for a variety of purposes. For example, the data could be used for maintenance purposes. The data could also be downloaded to provide a history of the operation of the machine 10 for further analysis. As another example, the data could be compiled with similar data from other machines to help determine events that are common to multiple machines.

A means 118 receives data from the controlling means 112 and transmits the data to a remote location. The transmitting means 118 may include a short range wireless link 120 or a long range radiofrequency (RF) link 122. Both types of transmitting links may exist on the same machine 10, in which case the controlling means 112 would determine which link to use, depending on which conditions may apply, as described below.

A short range wireless link 120 may include a telemetry link, a wireless infra-red link, or other suitable device for transmitting data over short distances. The short range wireless link 120 would be used when data of a routine nature is being transmitted as the result of a query. For example, when an on-highway semi-tractor truck pulls into a predetermined reporting station, such as a fuel station, a query may cause the contents of the on-board memory 115 to be downloaded into a remote terminal without any human intervention. Information from a fleet of trucks could then be sent to a home base location on an automatic, on-going basis.

Under some conditions, data from an event is considered important enough to send immediately to a remote location. For example, if an off-road mining truck experiences a mechanical problem that either immobilizes the machine 10 or could potentially immobilize the machine 10, the information about the problem needs to sent immediately to a remote location so that service personnel can be dispatched right away.

When the data must be sent immediately, the controlling means 112 would transmit the data via the long range RF link 122. Examples of long range RF links include, but are not limited to, VHF/UHF radio systems, satellite uplinks, and cellular modems. Long range RF link technologies are numerous and are well known in the art.

Figure 2:
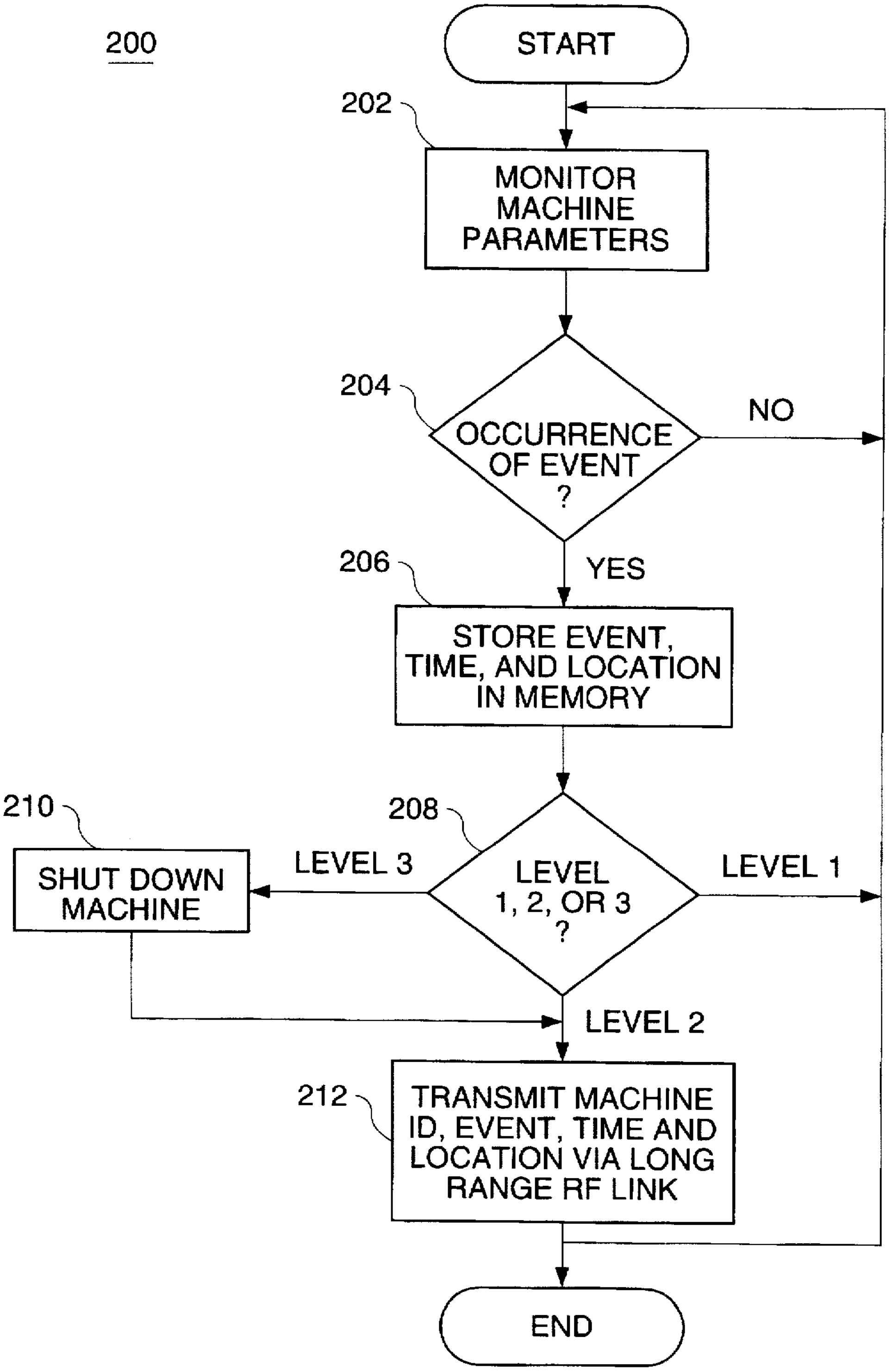
FIG. 2 is a flow diagram illustrating the method of FIG. 1.

Referring now to FIG. 2, a flow diagram of a method 200 for monitoring and controlling position referenced data is shown.

In a first control block 202 the machine parameters are monitored. This is accomplished either directly by receiving characteristics from the sensors 104 or indirectly by calculating parameters based on initial sensed characteristics.

In a first decision block 204, if an event has occurred, control proceeds to a second control block 206. In the second control block 206 the event, the time of occurrence, and the geographic location are stored in memory 115. The time and geographic location are obtained from the data sent by GPS receiver 110. The determination of the occurrence of an event by the controlling means 112 is based on characteristics received from the machine sensors 104, from which machine parameters are determined and compared to a set of predetermined criteria. For example, the outputs from the sensors 104 are defined to be within a range of values for normal operation. If the controlling means 112 receives a characteristic from a sensor which exceeds its predetermined normal range, an event is said to have occurred in the form of a deviation.

Another example of an event may be when a machine 10 crosses certain predetermined boundaries, such as state or county lines. Other examples of events may be defined by any occurrences during machine operation that may be of interest to the owner or operator of the machine 10.

If no event has occurred, operation returns to the first control block 202.

In a second decision block 208, in the preferred embodiment, the event is defined as a level one event, a level two event, or a level three event.

A level one event is classified as a minor deviation from normal operating parameters that would not adversely affect operation of the machine 10, or as a predetermined significant event. In the preferred embodiment, level one events are not transmitted right away, but are stored in memory 115 for future routine downloading.

Figure 3:
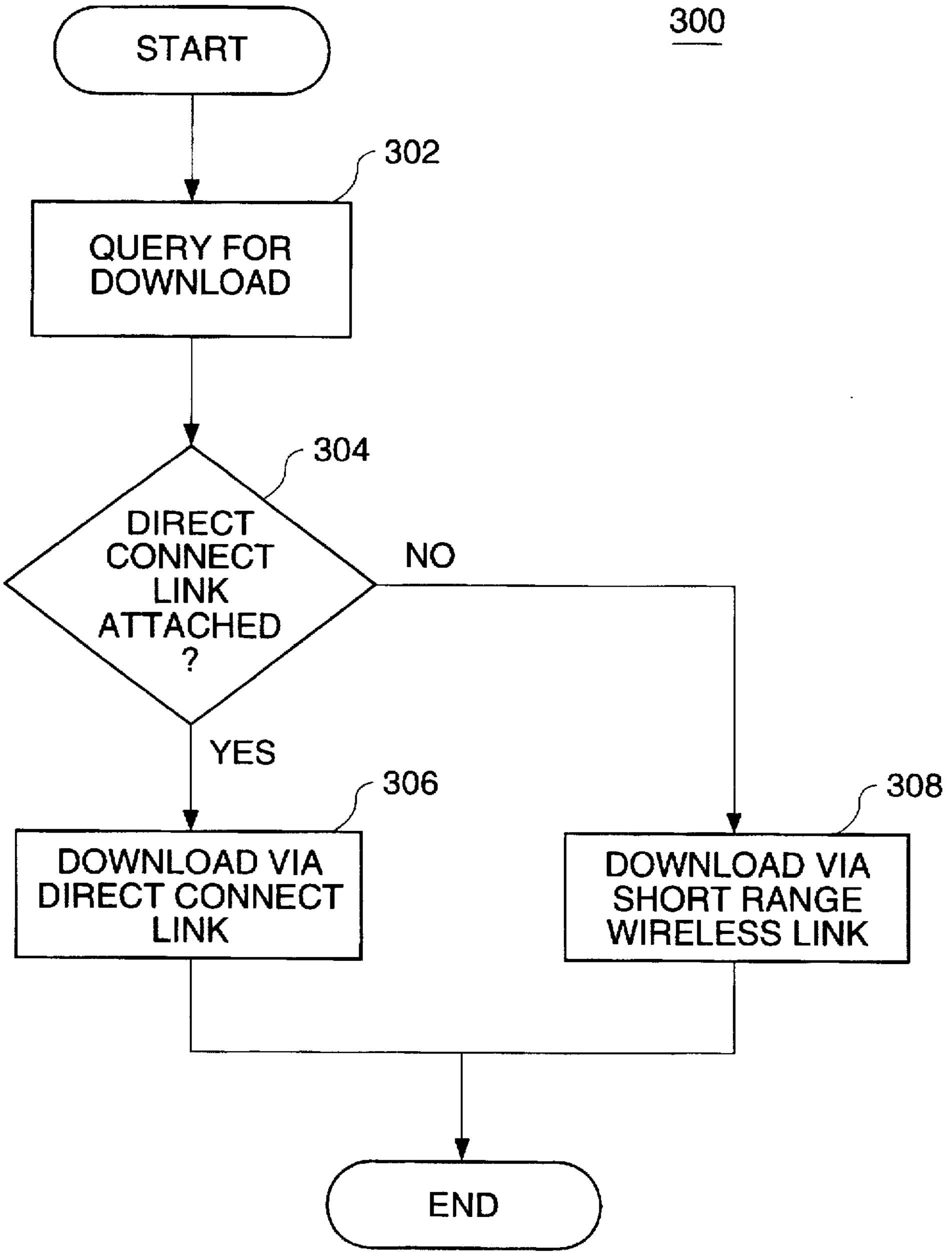
FIG. 3 is a flow diagram illustrating a method of downloading data.

Referring briefly to FIG. 3, a method 300 for downloading data is shown. In a first control block 302 a query command for downloading is sent. The query may be an operator initiated command such as a keyboard entry, or may be automatically sent when, for example, a machine 10 approaches a predetermined reporting station.

In a first decision block 304 it is determined if a direct connect link 116 is attached. If an attachment is made operation proceeds to a second control block 306 where the data is downloaded via the direct connect link 116. If no direct attachment is made then operation proceeds to a third control block 308 where the data is downloaded via a short range wireless link 120.

Referring to FIG. 2, a level two event is defined as a deviation from normal operating parameters that may have an adverse affect on the operation of the machine 10, or may soon create a situation where the operation of the machine 10 would be adversely affected. Usually, the machine 10 can continue to operate for a short period of time, but service personnel need to be notified right away to respond to the problem and thereby minimize downtime of the machine 10 and major repair costs.

A level two event would require operations to move to a third control block 212, where the machine ID, the event, the time of occurrence, and the geographic location are transmitted via a long range RF link 122. Operations then return to the first control block 202 to continue monitoring machine parameters.

A level three event is defined as a deviation from normal operating parameters that may have a severe adverse affect on the operations of the machine 10. For example, a sensor may indicate a severe problem which will soon cause a major breakdown if the machine 10 is not shut down right away, such as the failure of an engine bearing. Another example would be the imminent or total failure of a vital system e.g., a total failure of a brake system.

The determination of a level three event will cause the machine 10 to shut down (in a fourth control block 210) to prevent further, more costly damage.

After shutting down the machine 10, operations then move to the third control block 212 to transmit the machine ID, the event, the time of occurrence, and the geographic location via the long range RF link 122.

In the above description three levels of events were defined and classified. Alternative or additional classifications of levels may be used without deviating from the idea of the invention. For example, another level of an event could cause the machine 10 to reduce operating power to a predetermined lower range.

INDUSTRIAL APPLICABILITY

As an example of an application of the present invention, a fleet of on-highway semi-tractor trucks distributed throughout a large geographic area can be operated more efficiently if regular feedback is obtained concerning various operating parameters of the trucks with respect to the locations of the trucks as events occur. Data that is downloaded at predetermined reporting stations can be used to modify truck routes in order to purchase fuel in states with lower prices and less tax. Fleet operators can compile data that can be used to determine fuel consumption in various states to comply with various interstate transport regulations.

Also, any mechanical problems that a truck may have will be stored in memory and, if needed, transmitted to a base location for response by a maintenance crew. The information includes the geographic location of the machine at the time of the occurrence of the event. This information, when compiled into an historical database, may help in the understanding of events that are location or time dependent.

As another example of an application of the present invention, an open pit mining site has a fleet of off-road mining trucks that haul material from the mining areas to dump sites. Current technology is developing that will allow operating the trucks autonomously (no human operators). Under these conditions, events that occur during operation of the trucks will need to be recorded and communicated to a control station. For example, if a frequently traveled mine road has a hole or a rock that the trucks repeatedly traverse, sensors on the trucks would indicate a deviation from the normal operating parameters of the suspension systems. The present invention would record the events, as well as the geographic location where the event repeatedly occurs. A maintenance crew could then be dispatched to the location to repair the road surface before costly damage to the truck suspensions occurs.

Other aspects, objects, and features of the present invention can be obtained from a study of the drawings, the disclosure, and the appended claims.

I claim:

1. A system for recording the time and position of a machine during an occurrence of an event, comprising:

means for sensing operating characteristics of said machine;

means for receiving said operating characteristics, responsively determining a set of operating parameters, and detecting a deviation in said operating parameters of said machine;

means for determining a time of occurrence of said deviation;

means for determining a geographic location of said machine at said time of occurrence;

means for determining a level of significance of said deviation from one of three levels of significance, including a level one event, a level two event, and a level three event;

means for storing said deviation, said time of occurrence, said geographic location, and said level of significance in memory; and means for transmitting said deviation, said time of occurrence, and said geographic location to a remote location.

2. A system, as set forth in claim 1, wherein said deviation is defined as when a value of an operating parameter exceeds a predetermined limit.

3. A system, as set forth in claim 1, wherein said means for detecting a deviation includes a microprocessor located on said machine.

4. A system, as set forth in claim 1, wherein said transmitting means transmits said level of significance to said remote location if said level of significance equals said level two event.

5. A system, as set forth in claim 1, wherein said transmitting means transmits said level of significance to said remote location if said level of significance equals said level three event.

6. A system, as set forth in claim 5, wherein the occurrence of said level three event responsively causes said machine to shut down.

7. A system, as set forth in claim 1, wherein said transmitting means transmits said deviation, said time of occurrence, and said geographic location in response to said level of significance being equal to one of said level two event and said level three event.

8. A system, as set forth in claim 7, wherein said means for transmitting includes a long-range radiofrequency (RF) link.

9. A system, as set forth in claim 8, wherein said transmitting means transmits said deviation, said time of occurrence, and said geographic location immediately after an occurrence of one of said level two event and said level three event.

10. A system, as set forth in claim 1, wherein at least one of said operating parameters is equal to a corresponding at least one of said operating characteristics.

11. A system, as set forth in claim 1, wherein said means for determining a set of operating parameters calculates at least one of said operating parameters as a function of at least one of said operating characteristics.

12. A system, as set forth in claim 1, wherein:

at least one of said operating parameters is equal to a corresponding at least one of said operating characteristics; and said means for determining a set of operating parameters calculates at least one other of said operating parameters as a function of at least one of said operating characteristics.

13. A system, as set forth in claim 1, wherein said means for determining a geographic location includes a Global Positioning Satellite (GPS) System.

14. A system, as set forth in claim 1, wherein said means for transmitting includes a direct connect link to said memory.

15. A system, as set forth in claim 14, wherein said means for transmitting transmits said deviation, said time of occurrence, and said geographic location over said direct connect link as the result of a query command.

16. A system, as set forth in claim 1, wherein said means for transmitting includes a short-range wireless link.

17. A system, as set forth in claim 16, wherein said means for transmitting transmits said deviation, said time of occurrence, and said geographic location as said machine approaches a predetermined reporting station.

18. A method for recording the time and position of a machine during an occurrence of an event, including the steps of:

determining operating characteristics of said machine;

receiving said operating characteristics and responsively determining a set of operating parameters of said machine;

detecting a deviation of said operating parameters;

determining a time of occurrence of said deviation;

determining a geographic location of said machine at said time of occurrence;

determining a level of significance of said deviation from one of three levels of significance, including a level one event, a level two event, and a level three event;

storing said deviation, said time of occurrence, said geographic location, and said level of significance in memory; and transmitting said deviation, said time of occurrence, and said geographic location to a remote location.

19. A method, as set forth in claim 18, wherein the step of determining said level of significance is performed by a microprocessor located on said machine.

20. A method, as set forth in claim 18, wherein at least one of said operating parameters is equal to a corresponding at least one of said operating characteristics.

21. A method, as set forth in claim 18, wherein said step of determining a set of operating parameters includes the step of calculating at least one of said operating parameters as a function of at least one of said operating characteristics.

22. A method, as set forth in claim 18, wherein at least one of said operating parameters is equal to a corresponding at least one of said operating characteristics, and said step of determining a set of operating parameters includes the step of calculating at least one other of said operating parameters as a function of at least one of said operating characteristics.

23. A method, as set forth in claim 18, wherein the step of determining said time of occurrence is performed by reading a clock signal from a Global Positioning Satellite (GPS) System.

24. A method, as set forth in claim 18, wherein the step of storing is performed by a microprocessor located on said machine.

* * * * *